United States Patent [19]

Nishio et al.

[11] Patent Number: 5,073,330

[45] Date of Patent: Dec. 17, 1991

[54] METHOD OF MOLDING POLYSILAZANE

[75] Inventors: Hiroaki Nishio; Keiji Watanabe; Michitaka Sato, all of Tokyo, Japan

[73] Assignee: NKK Corporation, Tokyo, Japan

[21] Appl. No.: 560,679

[22] Filed: Jul. 31, 1990

[30] Foreign Application Priority Data

Jul. 31, 1989 [JP] Japan .................................. 1-196937
Jul. 31, 1989 [JP] Japan .................................. 1-196938

[51] Int. Cl.$^5$ ...................... B29C 39/02; B29C 49/00
[52] U.S. Cl. ........................................ 264/535; 264/65; 264/320; 264/553
[58] Field of Search ................ 264/523, 535, 65, 294, 264/320, 101, 544, 553, 552; 501/92, 154

[56] References Cited

U.S. PATENT DOCUMENTS 4,395,460  7/1983  Gaul ..................................... 428/408
4,689,382  8/1987  Lebrun et al. ........................ 528/12

OTHER PUBLICATIONS

Smith *Principles of Materials Science and Engineering* (1986).

*Primary Examiner*—James Lowe
*Assistant Examiner*—Christopher A. Fiorilla
*Attorney, Agent, or Firm*—Sughrue, Mion, Zinn, Macpeak & Seas

[57] ABSTRACT

A method of molding polysilazane which includes heating a liquid sheet composed of liquid polysilazane alone or containing not more than 30 wt. % of a ceramic powder or a ceramic precursor to form a highly viscous sheet having a viscosity coefficient of $10^4$ to $10^6$ poise, fitting the highly viscous sheet to a forming mold, and heating to set the sheet. According to the method of the invention, molded bodies are easily obtained which have relatively uniform thickness, and are excellent in transferability, homogeneous and show less defects.

18 Claims, 3 Drawing Sheets

METHOD OF MOLDING POLYSILAZANE

BACKGROUND OF THE INVENTION

FIELD OF THE INVENTION

This invention relates to a method of molding a thin hollow product of polysilazane which is a precursor of a ceramic of silicon nitride or a mixture of silicon nitride and silicon carbide.

Polysilazane is a polymer composed of silicon, nitrogen and hydrogen occasionally containing carbon, and is obtained as a liquid having a molecular weight of 200 to 800 immediately after synthesis. The liquid polysilazane is converted to a solid by heating.

In the case of an inorganic polysilazane $(H_2SiNH)_n$, when the heating temperature is gradually elevated, pyrolysis of the solid polysilazane begins around 150° C. and usually finishes around 600° C. The pyrolysis product is amorphous silicon nitride. However, a sintered body composed of α-silicon nitride and metal silicon is obtained by heating at a temperature of 1,000° to 1,800° C. at ordinary pressure in an inert atmosphere. When the heating is conducted in a nitrogen gas atmosphere, the sintered body obtained is a single phase of α-silicon nitride. A sintered body composed of silicon nitride and silicon carbide is obtained from $(CH_3SiHNH)_n$ through a similar treatment.

Incidentally, polysilazane has been noticed as a raw material of ceramics comparatively recently, and no reference has been found disclosing a molding method for polysilazane.

SUMMARY OF THE INVENTION

An object of the invention is to provide a method of molding a polysilazane molded body having a relatively uniform thickness from liquid polysilazane.

The inventors have investigated in order to achieve the above object, and found that when polysilazane is kept at a temperature of higher than 100° C., polymerization proceeds to obtain a viscous liquid capable of plastic molding.

Thus, the present invention provides a method of molding polysilazane which comprises heating a liquid sheet composed of liquid polysilazane alone or containing not more than 30 wt. % of a ceramic powder or a ceramic precursor to form a highly viscous sheet having a viscosity coefficient of $10^4$ to $10^6$ poise, fitting the highly viscous sheet to a forming mold, and heating to set the sheet. The above liquid sheet may be a tube, and the soft tube obtained by the first heating is expanded to fit to a mold.

DETAILED DESCRIPTION OF THE INVENTION

Figure 1:
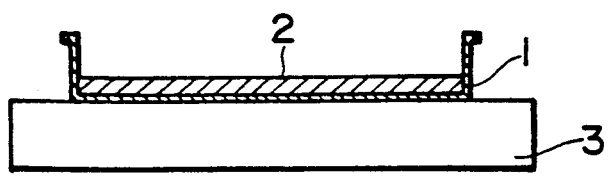
FIG. 1 is a sectional view indicating the state of forming a highly viscous sheet in an example of the invention.

The liquid polysilazane can be produced from a silane compound such as $H_2SiCl_2$, $H_3SiCl$ or $RSiHCl_2$. The R group of the above organic silane compound is methyl group, ethyl group, vinyl group, phenyl group or the like. Two or more silane compounds may be mixed. The silane compound is diluted with a solvent such as benzene, diethyl ether, dichloromethane, tetrahydrofuran or pyridine, and the solution is contacted with liquid or gaseous ammonia to produce polysilazane. The by-product ammonium chloride is filtered off, and the solvent is evaporated to obtain the liquid polysilazane.

There are various polysilazanes thus produced. Even when the starting materials are identical, the product varies according to the solvent, the reaction temperature, the pressure of the ammonia or the like. Representative polysilazanes include $[H_2SiNH]_x[(H_2Si)_{1.5}N]_y$, $[CH_3(CH_3NH)Si\ (CH_3N)]_x[CH_3Si(CH_3N)_{1.5}]_y$ and $(CH_3SiHNH)_x(CH_3SiHNCH_3)_y(CH_3SiN)_z$.

The liquid polysilazane may be used alone as the raw material for ceramics, or blended with a ceramic powder or a ceramic precursor other than polysilazane in a content up to 30 wt. % at the maximum. The purposes of the blending are for the acceleration of sintering, the improvement in the properties of ceramic sintered bodies, the improvement in the dimensional accuracy due to the reduction of contraction during the pyrolysis through sintering, and the like. The preferable ceramics for the above purposes are oxide powders added as a sintering aid such as yttria, alumina, magnesia, ceria, scandia and zirconia, nitride powders such as aluminum nitride and carbide powders such as silicon carbide added for the improvement in the high temperature strength of the sintered body, silicon carbide whiskers added for the improvement in the toughness, conductive ceramic powders added to provide conductivity to the sintered body such as titanium carbide and titanium nitride and the like. They may be added in a form of a precursor capable of conversion to ceramics by pyrolysis. For example, as the precursor of silicon carbide, there are polysilastyrene, polycarbosilane, etc., as the precursor of alumina, there are boehmite, alumina nitrate, etc., as the precursor of yttria, there are yttrium nitrate, etc., and as the precursor of carbon which reacts with silicon nitride to convert the same into silicon carbide, there are phenol resins, etc. When the content of the above ceramics and ceramic precursors is beyond 30 wt. %, the deformability of the compound is reduced, and cracks are liable to occur in the polysilazane sheet during the molding process described later.

The liquid polysilazane is formed into a liquid sheet having a thickness of about 0.1 to 30 mm, preferably 0.5 to 5 mm. When the thickness is less than 0.1 mm, cracks are liable to occur in the sheet during the molding process described later, while when the thickness is beyond 30 mm, the resistance to deformation of the sheet is great. As a result, the adhesion of the sheet to the mold becomes insufficient, and the transferability is degraded.

The form of the sheet is determined according to the form of the molded body, the molding process, and the like, and includes flat and tubular forms.

The sheet may be formed by pouring liquid polysilazane into a mold or by extruding liquid polysilazane from a die having a form of a section of the sheet. Alternatively, liquid polysilazane is spread on a support film by the doctor blade method. Thus, liquid polysilazane is formed into a liquid sheet by means of pouring, extruding, spreading or the like.

The method of the invention includes an embodiment where a soft tube is formed from liquid polysilazane and expanded to fit to a mold. In this case, the cavity of the mold for forming the soft tube may be of the one open end-one closed end-type or of the both ends open type. Both type molds are composed of an inner mold and an outer mold. In the former type mold, the soft tube is produced in a test tube form, and in the latter type mold, the soft tube is produced in a tube having both ends open. A heater is incorporated into the mold. The heater may be an electric heater or a pipe or jacket for circulating a heating medium.

The liquid polysilazane sheet is insufficient in formability. When it is put up or demolded, the thickness varies by the flow thereof. In order to avoid the flow, the liquid sheet is heated to cause the polymerization of polysilazane and is made into a gelatin-like highly viscous sheet (including a soft tube) having a viscosity coefficient of $10^4$ to $10^6$ poise. When the viscosity coefficient is less than $10^4$ poise, avoiding the flow thereof is insufficient, while when the viscosity coefficient is beyond $10^6$ poise, the resistance to deformation is great. As a result, the adhesion of the sheet becomes insufficient. As the heating temperature is lowered, the heating time to reach the above viscosity is necessarily longer. The heating time is shortened as the temperature is elevated. A suitable heating time also varies according to the thickness of the sheet. That is, as the thickness is thinner, the heating time is shorter, while the heating time is necessarily elongated as the thickness is increased. In the case of fitting the sheet to the mold by utilizing differential pressure or preparing the soft tube, the heating temperature is set according to the thickness so that the heating time is usually within 1 hour, preferably within 5 minutes. A suitable heating temperature is 100° to 300° C. When the temperature is lower than 100° C., the heating time is too long, while when the temperature is beyond 300° C., the pyrolysis of polysilazane increases. As a result, bubbles are generated on the surface and inside of the sheet, and remain as pores on the surface of the sintered body as the final product.

The highly viscous sheet thus obtained is fitted to a forming mold. In order to avoid slippage, the highly viscous sheet is preferably fixed to the circumferential edge of the mold prior to the fitting. As the means of fitting, utilizing differential pressure is preferred in view of rendering the thickness of the fitted sheet almost uniform, of securing sufficient fitting, etc. In this case, the fixing of the sheet to the circumferential edge of the mold is necessary. It is necessary that the circumferential edge is flat and that the inside portion to add a prescribed form to the sheet is recessed. The fixing may be conducted by nipping the whole circumferential edge capable of sealing the space between the sheet and the mold so as to obtain the necessary differential pressure. In the case that the highly viscous sheet is the soft tube, the tube is attached to a forming mold. Then, the pressure of the opposite side of the sheet to the forming mold, the inside in the case of the soft tube, is made greater than the mold side of the sheet by 0.1 to 10 kg/cm$^2$. By the pressure difference, the highly viscous sheet is fitted to the forming mold. In the case of the soft tube, it is expanded to fit to the forming mold. When the pressure difference is less than 0.1 kg/cm$^2$, the fitting of the sheet is insufficient, resulting in degraded transferability. A greater pressure difference renders the time necessary to fit to the mold shorter. However, this effect gradually decreases according to the increase of the pressure difference. When the pressure difference is beyond 10 kg/cm$^2$, the fitting is finished in a moment. The space between the forming mold and the sheet, the outside in the case of the soft tube, is preferably evacuated, though it may be the atmospheric pressure as it is, while the pressure of the opposite side is preferably raised, though it may be the atmospheric pressure as it is.

The temperature of the forming mold is preferably kept at 100° to 300° C. When the temperature is lower than 100° C., the time necessary for the setting of polysilazane fitted to the mold is too long, while when the temperature is beyond 300° C., the pyrolysis of polysilazane increases. As a result, bubbles are generated on the surface and inside of the sheet, and remain as pores on the surface of the sintered body as the final product. The heating means of the mold is not limited. For example, an electric heater is embedded in the mold, or a pipe for circulating a heating medium may be embedded. Alternatively, the mold is heated from the outside by attaching a jacket for a circulating heating medium or an infrared heater. The heating time is such that the sheet sets up to a prescribed degree.

Suitable materials for constructing the forming mold and the mold for molding the soft tube are metals such as aluminum, aluminum alloy, stainless steel, high speed steel, die steel, beryllium steel, soft steel, cast iron and zinc alloy, heat resistant rubbers such as silicone rubber and fluororubber, gypsum, wood, and the like. A vent hole may be provided, if necessary. The mold may also be constructed of a porous material. For this purpose, gypsum can be used. However, since the strength of gypsum is weak, a stronger material such as a porous resin, porous sintered metal or porous ceramic may be used.

The heat set sheet is sintered according to a known process to obtain a sintered body.

According to the method of the invention, molded bodies are easily obtained which have relatively uniform thickness, and are excellent in transferability, homogeneous and show less defects.

EXAMPLES

EXAMPLE 1

Figure 2:
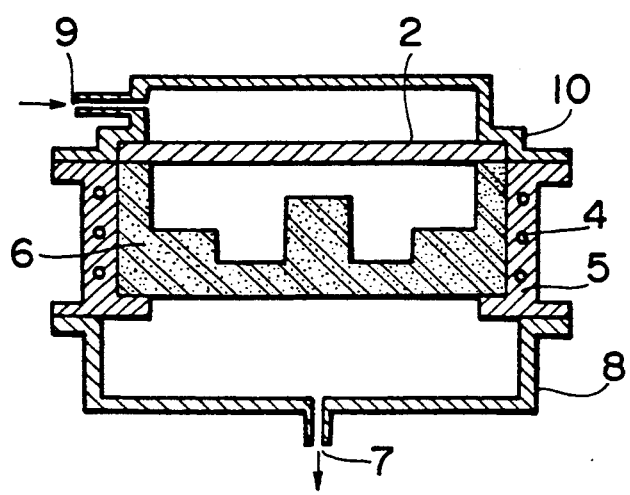
FIG. 2 is a sectional view indicating the state just before fitting of the highly viscous sheet to a mold.
Figure 3:
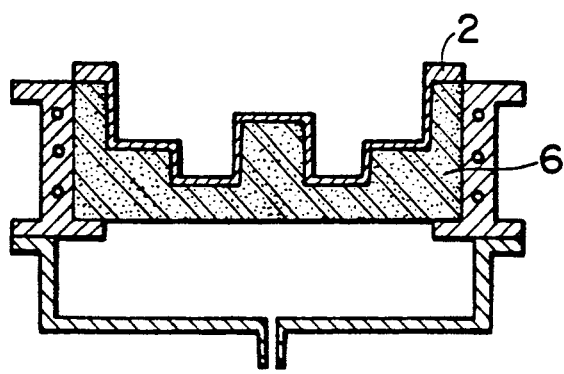
FIG. 3 is a sectional view indicating the state after the highly viscous sheet was fitted to the mold and thermally set.

As shown in FIG. 1, inorganic polysilazane oil which was a reaction product of $H_2SiCl_2$ and $NH_3$ was poured into an aluminum flat bottom vessel 1 having an inside diameter of 250 mm and a depth of 50 mm to form a liquid sheet 2 having a thickness of 20 mm. The vessel 1 containing the liquid sheet 2 was heated on a plate heater 3 at 150° C. for 15 minutes, and then naturally cooled to ordinary temperature. The vessel 1 was overturned, and a jellied highly viscous sheet 2 was taken out. The viscosity coefficient of the sheet was $2 \times 10^5$ poise. The sheet 2 was attached to the apparatus shown in FIG. 2. The apparatus was composed of a soft steel outer frame 5 including a heater 4, a mold 6 made of porous sintered stainless steel (mean pore size: 25 μm) having a circular cavity fitted to the outer frame 5, the lower cover 8 being made of soft steel and the upper cover 10 being made of soft steel. The cavity of the mold 6 had a circular channel on the bottom of which a circular step was formed, and the top of the central column was lower than the circumferential edge of the mold. The above three circles were concentric. The lower cover 8 had an exhaust port 7 connected with a rotary pump (not illustrated). The upper cover 10 had an air inlet port 9 connected with a compressed air tank (not illustrated). The mold 6 was heated by the heater 4 of the outer frame 5, and kept at 200° C. The highly viscous sheet 2 was placed on the upper circumferential edge of the mold 6, and fixed by nipping with the step portion of the circumferential edge of the upper cover 10. Immediately thereafter, the inside air was sucked by the rotary pump through the exhaust port 7, while compressed air was supplied through the air inlet port 9. The pressure of the air supply side was 6 kg/cm$^2$, and that of the exhaust side was 10$^{-2}$ Torr. The above conditions were kept for 5 minutes. Then, both of the suction and the air supply were stopped, and the upper cover 10 was detached. The sheet 2 was deformed, and fitted well to the mold 6, as shown in FIG. 3. The sheet 2 taken out of the mold 6 completely set, and the form of the cavity was faithfully transferred to the sheet 2.

The heat set sheet was placed in a sintering furnace, and in a nitrogen gas atmosphere at a pressure of 10 kg/cm$^2$, the temperature was elevated at a rate of 20° C./minute from ordinary temperature to 200° C., 2° C./minute from 200° C. to 600° C., and 20° C./minute from 600° C. to 1750° C., and then, naturally cooled for 1 hour. Thus, a silicon nitride sintered body was obtained which was uniformly contracted to 181 mm in outside diameter. The density of the sintered body was 89.6% of the theoretical density.

EXAMPLE 2

To 100 parts by weight of inorganic polysilazane, 2.1 parts by weight of alumina powder having a mean particle size of 0.15 μm and 6.2 parts by weight of yttria powder having a mean particle size of 0.12 μm were added, and the mixture stirred for 5 hours. The slurry was defoamed in vacuo to obtain a liquid polysilazane of which the principal component was inorganic polysilazane oil.

The liquid polysilazane was poured into the vessel 1, and a liquid sheet 2 having a thickness of 30 mm was formed similar to Example 1. The vessel 1 containing the liquid sheet 2 was heated at 120° C. for 30 minutes to obtain a jellied highly viscous sheet having a viscosity coefficient of 5×10$^5$ poise. The highly viscous sheet was attached to the apparatus shown in FIG. 2, and kept at 180° C. for 15 minutes, while the pressure of the air supply side was kept at 6 kg/cm$^2$ and that of the exhaust side was kept at 10$^{-2}$ Torr. The suction and air supply were stopped, and then the upper cover 10 was detached. The sheet 2 taken out of the mold 6 completely set, and the form of the cavity was faithfully transferred to the sheet 2.

The heat set sheet was sintered under the same conditions as Example 1, and a silicon nitride sintered body was obtained which was uniformly contracted to 175 mm in outside diameter. The density of the sintered body was 97.0% of the theoretical density.

EXAMPLE 3

Figure 4:
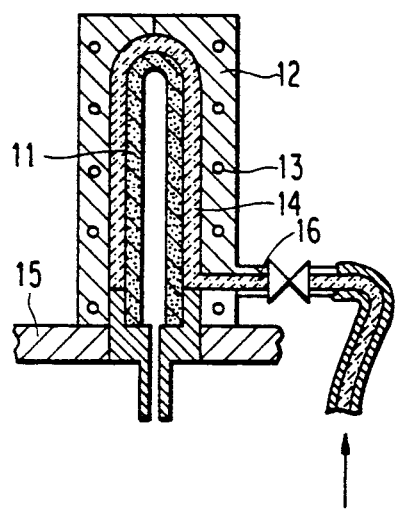
FIG. 4 is a sectional view indicating the state of forming a soft tube in another example of the invention.

The mold for forming the soft tube used was a one open end-one closed end-type composed of an inner mold 11 and an outer mold 12, as shown in FIG. 4. The inner mold 11 was made of porous alumina having a mean pore size of 25 μm and a porosity of 35%, and was in cylindrical form having an inside diameter of 20 mm, an outside diameter of 40 mm and a length of 150 mm, of which the upper end was closed in a semipherical form. The outer mold 12 made of aluminum was separable into 2 pieces, and was in columnar form having a hole of a similar shape which was a size larger than the inner mold 11 at the center. The outer mold 12 included an electric heater 13. The space between the inner mold 11 and the outer mold 12 was 12 mm, and it was used as a cavity 14. The mold was attached to a table 15, and the outer mold 12 was heated by the heater 13 at 200° C.

Figure 5:
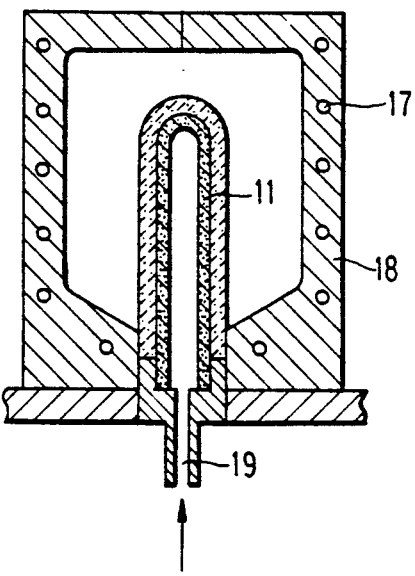
FIG. 5 is a sectional view indicating the state just before expanding the tube where the outer mold was exchanged for a forming mold.

The forming mold 18 made of aluminum was separable into 2 pieces, and included an electric heater 17, as shown in FIG. 5. The cavity was similar to a round bottle 170 mm in total length and 150 mm in diameter at the enlarged portion. The forming mold 18 was also heated by the heater 17 at 200° C.

Figure 6:
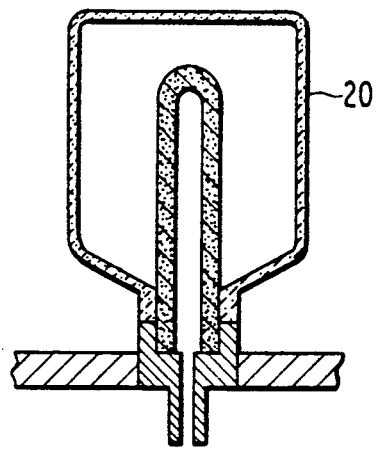
FIG. 6 is a sectional view indicating the state after the soft tube was expanded and thermally set.

Liquid inorganic polysilazane which was a reaction product of H$_2$SiCl$_2$ and NH$_3$ was injected from the injection inlet 16 shown in FIG. 4 into the cavity 14 of the mold. The mold was heated at 200° C. for 5 minutes to form a soft tube. The outer mold 12 was detached immediately, and the forming mold 18 was attached. This state is shown in FIG. 5. Subsequently, compressed air at 6 kg/cm$^2$ was blown into the inside of the inner mold 11 through the air inlet 19. The soft tube was expanded and fitted to the cavity wall of the forming mold 18. The forming mold 18 was heated at 200° C. for 10 minutes, while the expanded soft tube thermally set. The supply of compressed air was stopped, and the pressure of the cavity was returned to ordinary pressure. The forming mold 18 was detached to obtain a heat set formed body 20 as shown in FIG. 6.

The heat set formed body was placed in a sintering furnace, and in a nitrogen gas atmosphere at a pressure of 9.5 kg/cm$^2$, the temperature was elevated at a rate of 20° C./minute from ordinary temperature to 200° C., 2° C./minute from 200° C. to 600° C., and 20° C./minute from 600° C. to 1750° C., and then naturally cooled. Thus, a silicon nitride sintered body was obtained which was uniformly contracted to 108 mm in outside diameter. The density of the sintered body was 89.5% of the theoretical density.

EXAMPLE 4

To 100 parts by weight of liquid inorganic polysilazane which was a reaction product of H$_2$SiCl$_2$ and NH$_3$, 2.1 parts by weight of alumina powder having a mean particle size of 0.15 μm and 6.2 parts by weight of yttria powder having a mean particle size of 0.12 μm were added, and the mixture stirred for 5 hours. The slurry was defoamed in vacuo to obtain a liquid polysilazane of which the principal component was inorganic polysilazane oil.

Figure 7:
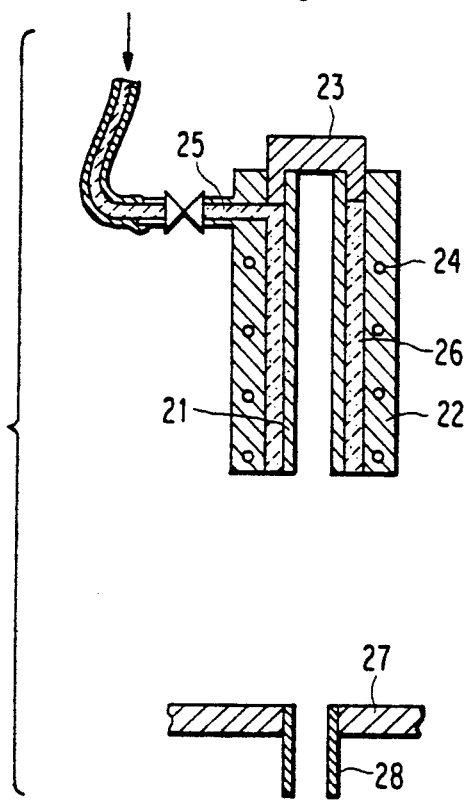
FIG. 7 is a sectional view indicating the state of forming a soft tube in another example of the invention.

A separable mold as shown in FIG. 7 was used. The mold was composed of a cylindrical inner mold 21, a cylindrical outer mold 22 and a spacer cap 23. The outer mold 22 included an electric heater 24, and was provided with an injection inlet 25 at the upper part. The cavity 26 was a cylindrical form having an inside diameter of 40 mm and a thickness of 12 mm of which the lower end was opened. The mold was disposed above a table 27 having a nozzle 28 leaving a space for placing a forming mold. The mold was heated at 160° C.

The forming mold 29 was a columnar form separable into 2 pieces wherein a cylindrical cavity 30 having an inside diameter of 150 mm and a total length of 120 mm was formed. The ceiling of the cavity was flat, and the bottom was slightly cone-shaped. The forming mold 29 was made of aluminum including an electric heater 31, and heated at 200° C.

Figure 8:
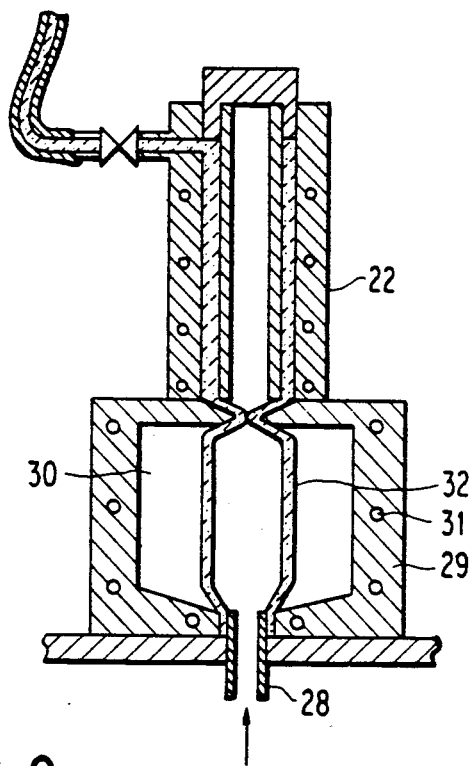
FIG. 8 is a sectional view indicating the state just before expanding the tube extruded from a mold for molding the tube where a forming mold was attached.
Figure 9:
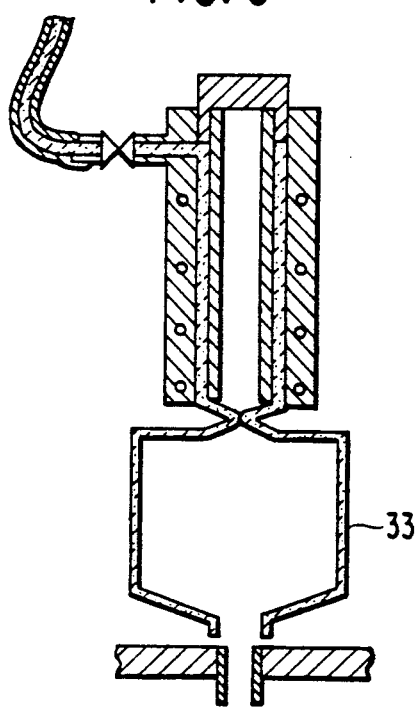
FIG. 9 is a sectional view indicating the state after the soft tube was expanded and thermally set.

The same liquid inorganic polysilazane as employed in Example 3 was injected from the injection inlet 25 into the cavity 26 of the mold. The mold was heated at 160° C. for 10 minutes to form a jellied soft tube, and then the soft tube was extruded from the cavity 26 by injecting succeeding liquid inorganic polysilazane into the cavity 26 through the injection inlet 25. Subsequently, the nozzle 28 was elevated, and the forming mold 29 was attached to close the upper part of the soft tube 32. This state is shown in FIG. 8. Immediately thereafter, compressed air at 6 kg/cm$^2$ was blown into the inside of the forming mold 29 through the nozzle 28. The soft tube was expanded and fitted to the cavity wall of the forming mold 29. The forming mold 29 was heated at 200° C. for 10 minutes, while the expanded soft tube thermally set. The supply of compressed air was stopped, and the pressure of the cavity was returned to ordinary pressure. The forming mold 18 was detached to obtain a heat set formed body 33 as shown in FIG. 9.

The upper closed portion of the heat set formed body was cut off, and sintered under the same conditions as in Example 3 to obtain a silicon nitride sintered body. The sintered body was uniformly contracted to 105 mm in outside diameter, and the density was 97.0% of the theoretical density.

We claim:

1. A method of molding polysilazane which comprises heating a liquid comprising a liquid polysilazane alone or containing not more than 30 wt. % of a ceramic powder or a ceramic precursor to form a highly viscous sheet having a viscosity coefficient of 10$^4$ to 10$^6$ poise, fitting the highly viscous sheet to a forming mold, and heating through the forming mold to set the sheet at a temperature of 100° to 300°.

2. The method of claim 1 wherein the liquid sheet is composed of liquid polysilazane alone.

3. The method of claim 1 wherein the liquid sheet is composed of liquid polysilazane and not more than 30 wt. % of a ceramic powder or ceramic precursor.

4. The method of claim 1 wherein said fitting is conducted by forming a differential pressure between the forming mold side and the opposite side of the forming mold so that the pressure of the forming mold side is lower than the opposite side.

5. The method of claim 4 wherein said forming mold is porous or has a vent hole.

6. The method of claim 1 wherein said liquid sheet is a tube and said fitting is conducted by the expansion of the tube.

7. The method of claim 1, wherein the polysilazane is an inorganic polysilazane having the formula of $[H_2SiNH]_x[(H_2Si)_{1.5}N]_y$.

8. The method of claim 2, wherein the polysilazane is an inorganic polysilazane having the formula of $[H_2SiNH]_x[(H_2Si)_{1.5}N]_y$.

9. The method of claim 3, wherein the polysilazane is an inorganic polysilazane having the formula of $[H_2SiNH]_x[(H_2Si)_{1.5}N]_y$.

10. The method of claim 4, wherein the polysilazane is an inorganic polysilazane having the formula of $[H_2SiNH]_x[(H_2Si)_{1.5}N]_y$.

11. The method of claim 5, wherein the polysilazane is an inorganic polysilazane having the formula of $[H_2SiNH]_x[(H_2Si)_{1.5}N]_y$.

12. The method of claim 6, wherein the polysilazane is an inorganic polysilazane having the formula of $[H_2SiNH]_x[(H_2Si)_{1.5}N]_y$.

13. The method of claim 1 wherein the polysilazane is a polymer of monosilane.

14. The method of claim 2 wherein the polysilazane is a polymer of monosilane.

15. The method of claim 3 wherein the polysilazane is a polymer of monosilane.

16. The method of claim 4 wherein the polysilazane is a polymer of monosilane.

17. The method of claim 5 wherein the polysilazane is a polymer of monosilane.

18. The method of claim 6 wherein the polysilazane is a polymer of monosilane.

* * * * *